United States Patent [19]

Lair

[11] 4,097,564

[45] Jun. 27, 1978

[54] METHOD OF COATING FLEXIBLE SLEEVING

[75] Inventor: Wilbert M. Lair, Londonderry, N.H.

[73] Assignee: Electronized Chemicals Corporation, Burlington, Mass.

[21] Appl. No.: 739,718

[22] Filed: Nov. 8, 1976

[51] Int. Cl.² .............................. B29F 3/08; B29F 3/10
[52] U.S. Cl. ...................................... 264/22; 264/173; 264/209; 264/174
[58] Field of Search ................. 427/44, 314, 356, 358; 264/22, 173, 174; 425/113

[56] References Cited

U.S. PATENT DOCUMENTS

| 2,401,550 | 6/1946 | Cook .................................... 264/174 |
| 3,106,748 | 10/1963 | Skobel ................................. 264/173 |
| 3,387,065 | 6/1968 | Derbyshire et al. ............. 264/174 X |
| 3,533,133 | 10/1970 | Meitinger ............................. 425/113 |

Primary Examiner—Ronald H. Smith
Assistant Examiner—Sam Silverberg
Attorney, Agent, or Firm—Russell & Nields

[57] ABSTRACT

A method of coating flexible sleeving is disclosed generally comprising the steps of passing flexible sleeving from a supply source into a heating unit, heating the flexible sleeving in the heating unit to an outside surface temperature sufficient to aid extrudate bonding but insufficient to damage the flexible sleeving, passing the heated flexible sleeving through a crosshead extrusion die assembly wherein the tip and die have substantially zero land length without the application of deformative forces beyond apparatus friction to the flexible sleeving, extruding a coating of an electrically insulative resinous material onto the flexible sleeving in the crosshead extrusion die, cooling the coated flexible sleeving, and processing the cooled, coated flexible sleeving so as to render it thermally stable at all temperature extremes in which use thereof is contemplated.

8 Claims, 2 Drawing Figures

METHOD OF COATING FLEXIBLE SLEEVING

BACKGROUND

The present invention relates to a method for making thermally stable, electrically insulative, coated flexible sleeving, and more particularly to a method of making such sleeving wherein the coating substance is applied to the sleeving by extrusion without danger of sleeve collapse and wherein an irradiation step is utilized to alter the internal structure of the coating material so as to render it substantially thermally stable at temperature extremes such coated flexible sleeving may be expected to encounter in use.

Heretofore, coated flexible sleeving has been produced either by a dip coating process or by extruding the coating material onto flexible sleeves which are supported in various manners to avoid collapse. Each of these methods has been found to have significant operational drawbacks.

Dip coating requires the sleeving to be advanced through a bath of coating material maintained in a liquid, or at least semi-liquid, state. Consequently, the process is slow requiring a curing step to remove the solvents used to maintain the liquidity of the bath; inefficient due to the tendency toward porosity, with its accompanying decrease in average dielectric strength, in the resultant coating and due to the inherently limited coating thickness achievable from any one "dip" as determined by the particular adhesion characteristics of the sleeving-coating interface; and expensive in terms of time, space, tooling and operation.

Extrusion as practiced heretofore, on the other hand, provides a more uniform dielectric film, and is less expensive and more efficient than dip coating. Also, the parameters of thickness and porosity of coating, and curing times do not present significant disadvantages in the extrusion context. There are significant problems with present extrusion coating process, however; the most significant being the necessity of maintaining sleeve roundness during the coating process in order to assure adequate and uniform coating as against the tendency of the flexible sleeve to collapse under the radial extrusion pressures heretofore required to assure adequate sleeve to coating bonding. Numerous attempts have been made to remove or to alleviate this tendency toward sleeve collapse. For example, internal supports located within the sleeving at the point at which it passes through a crosshead extrusion die have been used. Such internal supports, however, display a tendency, in conjunction with normal extrusion pressures, toward retardation of sleeve passage through the extrusion die, and may in extreme cases cause binding and jamming of the extruder and tearing of the sleeve. U.S. Pat. No. 3,049,762 issued to Jackson, U.S. Pat. No. 3,106,748 issued to Skobel, U.S. Pat. No. 3,359,357 issued to Bentley et al. and U.S. Pat. No. 3,790,651 issued to Meitinger disclose further slightly different attempts to solve the sleeve collapse problem.

Specifically, Jackson has shown that flexible tubing comprising an inner hollow synthetic plastic core and an outer layer of braided natural or synthetic fibers may be coated and the coated tube heat treated without collapse of the tubing even if the inner core is softened by heat, Jackson accomplishes this by coating such tubing only in defined lengths and maintaining the interior of such lengths under fluid pressure which is variable in accordance with the other parameters of his system during processing. Jackson is thus incapable of continuous operation and has introduced tooling and manufacturing complexities which are difficult if not impossible to handle in cases wherein only the fibrous layer is to be coated with no internal core present.

Skobel shows a process wherein flexible sleeving consisting of woven fiberglass or the like is pulled through an opening of smaller diameter than the normal sleeving diameter immediately prior to its passage through the extruder. This process constricts the sleeving thereby compacting the woven fibers and rigidifying the sleeving in the desired rounded configuration. Skobel has thereby shown that the internal support can be successfully discarded; however, the problems caused by internal supports, i.e. jamming, binding, tearing — remain albeit at an earlier point in the process and perhaps to a lesser degree.

Bentley et al, takes the approach that a satisfactory coating effectively bonded to the flexible sleeve may be achieved under delicately controlled conditions of radial extrusion pressure and longitudinal sleeve tensioning. Such an approach avoids the problems of internal supports and/or constrictions cited above but at the same time adds a complexity to the process at least as great as those which it avoids; namely, achieving, monitoring and maintaining the required delicate balance under manufacturing conditions.

Finally, Meitinger, the most recent of these attempts to alleviate and/or solve the sleeve collapse problem, shows a process wherein a non-self-supporting tubular article may be coated without collapse by rounding the tubing by means of an internal ball as it enters the extruder, synchronizing the extrudate flow rate with the rate of tube movement, and radially constricting the coated tube immediately subsequent to extrudate application. This process, while different from all of the above, still displays many of the same troublesome features found in the aforementioned processes.

Further, the majority of the presently available processes for the extrusion of coatings upon flexible sleeving require the application and cure of a primer or an adhesive in order to assure an adequate coating to sleeve bond despite the presence of relatively high radial extrusion pressures. The presence of such a requirement in these processes introduces the not insignificant problems of added cost due to the presence of the adhesive application step, of porosity in the adhesive layer, and of increased bonding difficulty and decreased thermal stability due to the dissimilarity of materials, all of which may result in nonuniform bonding, and in an inferior, nonsalable product unless carefully controlled.

SUMMARY OF INVENTION

The method of the present invention generally comprises the steps of continuously playing flexible sleeving out from a supply reel into a gas or electrical heating unit; heating the sleeving until its outside surface temperature is between 500° F and 800° F, preferably approximately 750° F; passing the heated sleeving without constriction, expansion, internal support, or the application of deformative forces of any kind beyond the inherent frictional drag of the apparatus on the sleeving, from the heating unit into and through the core tube portion of a typical crosshead extrusion die assembly whereupon a radiation sensitive electrically insulative plastic or elastomeric extrudate is extruded onto the sleeving through a partial pressure (non-landed) type extrusion die tip which creates a radial extrusion pressure insufficient to collapse the sleeving and an axial extrusion pressure sufficient to pull the sleeving through the core tube portion of the die; passing the coated sleeving from the extrusion die-tip assembly through a cooling bath; collecting the cooled, coated sleeving as it emerges from the cooling bath; and irradiating the collected, cooled, coated sleeving. For the majority of extrudable thermo-plastic resinous extrudates the irradiation is accomplished with high energy electrons to a dosage from about 2 megarads to about 30 megarads such that the effective crosslinkage of the coating material is sufficient to render the extrudate material substantially thermally stable (i.e. non-melting) at the temperature extremes contemplated for each lot of coated flexible sleeving so produced. The exception to this is vinyl which I have found to display satisfactory properties when irradiated with high energy electrons to a dosage from 0 megarads to about 2 megarads. I have also found that extrudable elastomeric resins such as silicone rubber may be heat vulcanized to yield similar properties to those of irradiated thermo-plastics.

It is thus an object of the present invention to provide a method of making coated flexible sleeving, having high dielectric strength and substantially uniform physical and electrical properties, by the extrusion of an electrically insulative plastic or elastomeric material onto a flexible sleeve in such a way that the extruded material is satisfactorily bonded to the flexible sleeve without the necessity of providing special means for the prevention of the collapse of the flexible sleeve during the extrusion operation or the use of adhesive.

It is also an object of this invention to provide a fast and relatively efficient method of making coated flexible sleeving which is highly consistent in result and which displays substantially no tendency to bind or jam the extruder or to tear the sleeve.

It is a further object of the present invention to provide a method for making coated flexible sleeving wherein improved thermal stability of the resulting product is achieved by causing internal structural changes in the coating material by the irradiation thereof with high energy electrons subsequent to its extrusion onto the sleeving substrata.

BRIEF DESCRIPTION OF THE DRAWINGS

Further benefits and advantages of the present invention will become apparent as the following detailed description of a preferred embodiment thereof proceeds with reference to the accompanying drawings in which.

DETAILED DESCRIPTION OF A PREFERRED EMBODIMENT

Figure 1:
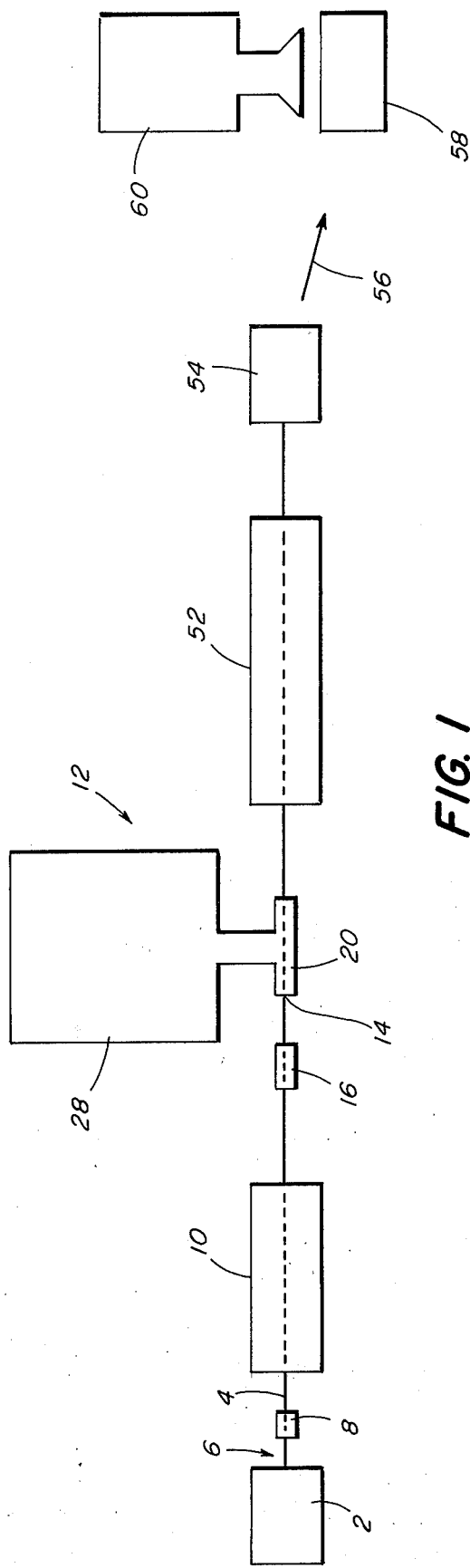
FIG. 1 is a block diagram of an apparatus suitable for carrying out the process of the present invention.

Referring to the drawings, FIG. 1 shows the various pieces of apparatus, which are operated in left to right sequence in effecting the various process steps of this invention, in representative block form. Considering this apparatus in its operational sequence, it will be seen that supply reel 2 supplies a continuous length of flexible sleeving 4 to the remainder of the processing apparatus. The flexible sleeving 4 shown is contemplated to be a braided fiberglass fabric sleeve, but may be of any of a variety of constructions or materials which will withstand the temperature extremes encountered in the extrusion phase of the present process. Further, the supply reel 2 is equipped with positive power drive means (not shown) coordinated with the process "line speed". This assures that flexible sleeving 4 may pass therefrom to and through the other apparatus without restriction and without the adverse effects on the ultimate bond between the extrudate and the sleeve longitudinal tensioning of the sleeve has been found to introduce. It is also specifically contemplated, that a loop or other intermediate reservoir or sleeving may permissibly collect in the area generally indicated at 6 without adverse effect upon the free operation of the process of this invention.

From the area 6 the flexible sleeving passes over an idler 8 and into a heating chamber 10, which may be conveniently either electric or gas fired, wherein the flexible sleeving 4 is heat treated prior to receiving the extruded coating at the extruder 12 to which it next passes. The heat treatment is such that the outside surface temperature of the sleeve 4 will be between 500° F and 800° F and preferably approximately 750° F as the sleeve 4 enters the core tube 18 of the die portion 20 of the extruder 12 which is contemplated to be of a type well known to those skilled in the art. It should be noted that the temperatures recited above assume the prior heat treatment (caramelizing) of the braid to remove oil, starch and so on used as sizing in making such sleeving. If such prior treatment has not been accomplished, it may be done in the heating chamber 10 by heating the fiberglass sleeving to about 1200° F so long as the sleeving is given a chance, for instance by increasing the distance from heating chamber 10 to extruder 12, to cool to about 750° F prior to entering the crosshead die. It should also be understood that appropriate temperature adjustments may be made to accommodate sleeve materials other than fiberglass.

The crosshead die, of extruder 12, generally indicated at 20, however, is of a specific type suitable for the extrusion of a tubular article without the need for an internal mandrel whose details are most readily understood by reference to the cross-secitonal view of FIG. 2, as hereinafter more fully appears.

Immediately prior to entering the core tube 18 of the crosshead die 20 of the extruder 12 at 14, the preheated flexible sleeving 4 may permissibly pass through or over one or several centering and/or rounding devices (not shown) of any well known type, in the area generally indicated at 16 as the particular parameters of the extrusion apparatus used and final product quality may require. Such centering and/or rounding devices merely assure "true" path of travel and sleeve roundness, and do not constrict the sleeve. The sleeving 4 thence proceeds through core tube 18 of the crosshead die 20, which is of slightly greater diameter than the sleeving 4.

Figure 2:
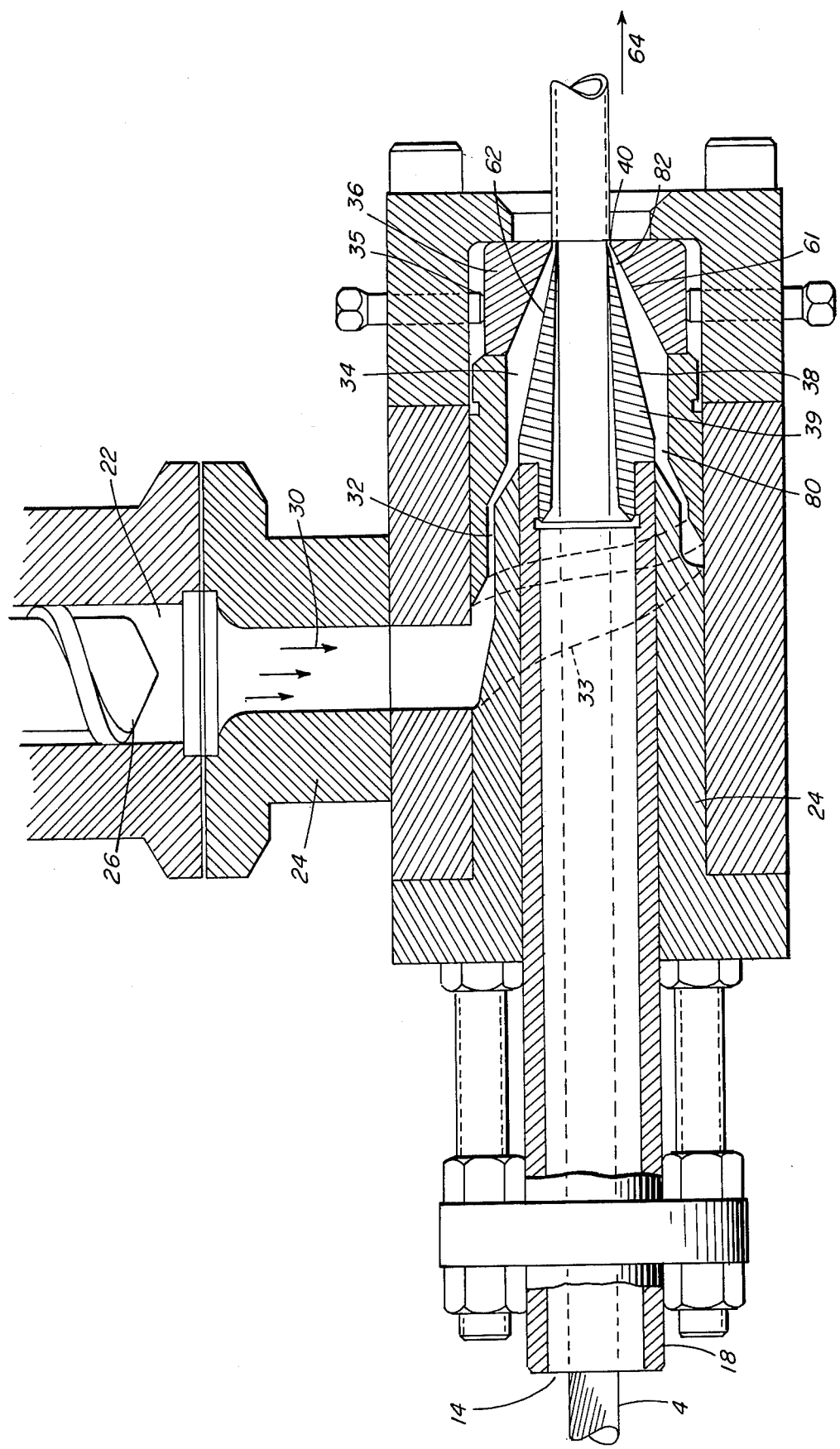
FIG. 2 is a diagrammatic view in partial section of a crosshead extrusion die housing and tip assembly suitable for use in the process of the present invention.

As indicated above the details of the extrusion operation, and thus of crosshead die assembly 20, are most clearly shown in FIG. 2. The extrudate material 22, contemplated to be a radiation sensitive electrically insulative, plastic or elastomeric material prepared for extrusion in any manner well known and acceptable for such materials in the art, is forced into housing 24 by feed screw 26 from extrudate reservoir 28 (shown in FIG. 1) in the direction of arrows 30, and thence into passage 32 which surrounds core tube 18. As the extrudate melt is forced into passage 32 it hits vane 33 (shown in dotted lines in FIG. 2) which changes its direction of flow 90° and it is split both as it flows around the exterior of the core tube 18 and as it flows around the mounting brackets (not shown) which maintain the core tube 18's position in the crosshead housing 24. The extrudate, however, is forced back together by the decreasing depth of space in the housing 24 well prior to its application to the sleeving 4. If desired, an extrudate melt distributor in the form of a pressure equalizing ring or other means (not shown) may also be inserted in the area generally indicated at 80 in order to further assure complete rejoinder of the extrudate and to balance the internal pressure of the extrudate thereby smoothing out the flow and assuring that the extrudate reaches the forming area 82 at substantially the same velocity at all quadrants around the core tube.

From passage 32 the extrudate passes out through passage 34 in die 35 onto the sleeving 4. The passage 34 in die 35 is located between outer core portion 36 of die 35 and inner core portion 38 of tip 39, and is designed such that its outer wall is inclined at approximately 45° to the direction of travel 64 of flexible sleeve 4 and its inner wall 62 is inclined at approximately 30°–35° to the direction of travel 64 of flexible sleeve 4. The actual angles of walls 61 and 62 to the direction of travel 64 may vary, however, the components of extrusion force exerted upon the sleeve 4 must always fall within the description contained in the following paragraphs. It should further be noted that no land area is provided in this design in the area generally indicated at 40.

The force of the extrudate issuing from passage 34 of crosshead die 20 in the present case resolves into components prependicular and parallel to the direction of sleeve movement, and experiments have shown that the above design creates a situation wherein the perpendicular force is insufficient to collapse the flexible sleeve 4, and the parallel force is adequate to pull the sleeve 4 through core tube 18 of crosshead die 20 without external aid. In fact, experiments using this type of die and tip have shown that a tubular article is extruded by such a die even without the presence of a substrata layer of sleeving or an internal mandrel. The addition of even 1/10 inch of land in the area 40, however, seriously affects the forces present as the extrudate leaves the crosshead. The overall force of the extrudate in such a case is the same as above, however, the addition of land area in the area 40 causes a drag on the extrudate layer which reduces the parallel force and also allows extrudate back pressure to build up thereby increasing the perpendicular force with a resultant increase in the tendency toward sleeve collapse. In the case of a "landed die" experiments show that a tubular article will not result from extrusion runs without substrata or an internal mandrel.

Upon passing from the extruder 12, the now coated flexible sleeve 4 enters and passes through cooling trough 52 and thence to sleeve collecting equipment 54. The collecting equipment 54 is contemplated to be such that once a predetermined quantity of sleeving is collected, it may be moved as shown by arrow 56 to irradiation point 58 and separate collecting equipment (not shown) substituted.

At irradiation point 58 the coated flexible sleeving is irradiated by bombardment with high energy electrons from radiation source 60, which may be a Van de Graaff accelerator or similar device well known to those skilled in the art, to a dosage level of between 2 and 30 megarads depending upon the properties desired for the finished product.

The process of this invention thus includes the following steps: continuously playing flexible sleeving 4 out from a supply reel 2 into heating chamber 10; heating the flexible sleeving 4 as it passes through heating chamber 10 such that upon leaving heating chamber 10 the outside surface temperature of flexible sleeving 4 is on the order of 750° F; passing the heated flexible sleeving 4 into and through the crosshead die portion 20 of extruder 12, substantially as described above, whereby it is coated with a radiation sensitive plastic or elastomeric extrudate; passing the coated flexible sleeving through cooling trough 52; collecting the cooled, coated, flexible sleeving; and irradiating said collected, cooled, coated, flexible sleeving so as to achieve a level of crosslinkage of the extrudate molecules sufficient to render the coated sleeve substantially thermally stable at all temperatures at which use of the coated flexible sleeve is contemplated.

I have found that the primary, and in fact substantially the only, limitation on this process is with respect to the selection of materials. My process operates at substantially higher extremes of temperature than have been used heretofore, and consequently, care must be taken to avoid burning of the sleeves or of the extrudate. In some situations it may even be necessary to provide cooling means for the crosshead die.

The importance of this process cannot be traced to any single step thereof. It is the combination of heat treatment, the manner of extrudate introduction, and irradiation which currently allows the manufacture of coated flexible sleeving which meets criteria established for such insulative coated flexible sleeving by Underwater's Laboratories, the National Electrical Manufacture Association (Pub. VS1 — 1962), the American Society of Testing and Material (ASTM Designation: D 350-68), and the United States Military (Military Specification: MIL-I-003190C, July 28, 1969) as well as the general needs of consumers without needless tooling costs, complex control and monitoring systems, or irritating down time caused by machine jamming and/or failure caused by process parameters, yet with a reduction in quality control testing requirements due to the uniformity and consistency of the coating.

The process in no way restricts sleeve movement beyond the inherent frictional drags present in the apparatus used and relies upon increased heat to assure appropriate extrudate flow and bonding. After application to the flexible sleeve it should also be made clear that, as in prior processes, parameters such as coating thickness, speed of operation, and the like are contemplated to be readily variable by well known techniques, and that well known expedients such as rounding and centering devices may be added to my process without departure from the inventive scope thereof.

It should further be understood that the embodiments and practices described and portrayed herein have been presented by way of disclosure, rather than limitation, and that various modifications, substitutions, and combinations may be effected without departure from the spirit and scope of this invention in its broader aspects.

I therefore claim:

1. A process for coating continuous lengths of flexible sleeving with an electrically insulative resinous material comprising the steps of:
   (a) passing the flexible sleeving through a preheating unit;
   (b) heating the flexible sleeving in the preheating unit to an outside surface temperature insufficient to damage the flexible sleeving yet sufficient to aid extrudate bonding thereto between 500° and 800° F;

(c) passing the preheated flexible sleeving issuing from the preheating unit through a crosshead extrusion die assembly having a core tube, a tip, and a die, said core tube and tip defining a sleeving passage of greater diameter than the flexible sleeving, said die providing an inner diameter greater than that of the flexible sleeving and having substantially zero land length, said tip and said die defining an extrudate channel meeting said sleeving passage at an acute angle between said tip and said die;

(d) extruding an electrically insulative resinous material onto said flexible sleeving under conditions of very low radial pressure and comparatively high axial pressure in said crosshead extrusion die assembly; and (e) cooling the coated, flexible sleeving issuing from said crosshead extrusion die assembly.

2. The process for coating flexible sleeving of claim 1 wherein the flexible sleeving is caramelized fiberglass.

3. The process for coating flexible sleeving of claim 1 wherein the extrudate is an extrudable elastomeric resinous material.

4. The process for coating flexible sleeving of claim 1 including the step of irradiating the cooled coated flexible sleeving.

5. The process for coating flexible sleeving of claim 4 wherein the radiation is high energy electrons applied in doses of 0 to 30 megarads.

6. The process for coating flexible sleeving of claim 1 wherein the extrudate is an extrudable thermoplastic resinous material.

7. A method of coating flexible braided sleeving comprising preheating a length of sleeving to an outside surface temperature between 500° and 800° F, covering said preheated length of sleeving with an extrudate thermoplastic resin or an extrudable elastomeric resin by extrusion in a crosshead extrusion die having substantially zero land length, and irradiating said covered sleeving with ionizing radiation.

8. A process for coating continuous lengths of flexible sleeving formed of raw fiberglass braid with an electrically insulative resinous material comprising the steps of:

(a) passing the flexible sleeving through a preheating unit;

(b) heating the flexible sleeving in the preheating unit to an outside sirface temperature of about 1200° F so as to caramelize the sleeving;

(c) cooling the caramelized sleeving issuing from the preheating unit to an outside surface temperature between 500° and 800° F;

(d) passing cooled caramelized sleeving through a crosshead extrusion die assembly having a core tube, a tip, and a die, said core tube and tip defining a sleeving passage of greater diameter than the flexible sleeving, said die providing an inner diameter greater than that of the flexible sleeving and having substantially zero land length, said tip and said die defining an extrudate channel meeting said sleeving passage at an acute angle between said tip and said die;

(e) extruding an electrically insulative resinous material onto said caramelized sleeving under conditions of very low radial pressure and comparatively high axial pressure in said crosshead extrusion die assembly; and (f) cooling the coated, caramelized sleeving issuing from said crosshead extrusion die assembly to ambient temperature.

* * * * *